(12) United States Patent
Boxberg et al.

(10) Patent No.: US 11,722,025 B2
(45) Date of Patent: Aug. 8, 2023

(54) ROTOR FOR ELECTRIC MOTORS

(71) Applicant: TRANE INTERNATIONAL INC., Davidson, NC (US)

(72) Inventors: Fredrik Boxberg, Espoo (FI); Charles J. Peterson, La Crosse, WI (US); Yubo Nian, La Crosse, WI (US); Petri J. Mäki-Ontto, Espoo (FI); Lauri Juhani Salmia, Espoo (FI); Russell T. Abbott, Caledonia, MN (US); Tomas Fajt, La Crosse, WI (US); Seth M. McGill, Brookings, SD (US)

(73) Assignee: TRANE INTERNATIONAL INC., Davidson, NC (US)

( * ) Notice: Subject to any disclaimer, the term of this patent is extended or adjusted under 35 U.S.C. 154(b) by 165 days.

(21) Appl. No.: 17/139,253

(22) Filed: Dec. 31, 2020

(65) Prior Publication Data

US 2022/0209598 A1 Jun. 30, 2022

(51) Int. Cl.
*H02K 1/27* (2022.01)
*H02K 15/03* (2006.01)
*H02K 11/01* (2016.01)
*H02K 1/28* (2006.01)
*H02K 1/278* (2022.01)

(52) U.S. Cl.
CPC ........... *H02K 1/278* (2013.01); *H02K 11/012* (2020.08); *H02K 15/03* (2013.01)

(58) Field of Classification Search
CPC ...... H02K 1/278; H02K 11/012; H02K 5/128; H02K 15/03
See application file for complete search history.

(56) References Cited

U.S. PATENT DOCUMENTS 4,433,261 A * 2/1984 Nashiki .................. H02K 1/278
310/156.28
4,617,726 A * 10/1986 Denk ..................... H02K 1/278
228/186

(Continued)

FOREIGN PATENT DOCUMENTS

DE 102016211246 A1 12/2017
JP 2013-9553 A 1/2013
WO 02/078154 A1 10/2002

OTHER PUBLICATIONS

Extended European Search Report issued in European Patent Application No. 21215004.9, dated May 27, 2022 (6 pages).

*Primary Examiner* — Burton S Mullins
(74) *Attorney, Agent, or Firm* — Hamre, Schumann, Mueller & Larson, P.C.

(57) ABSTRACT

Permanent magnet rotors for electric motors, particularly electric motors for use in compressors, improve the electromagnetic efficiency of the motor. The rotors can include retention of surface permanent magnets using one or more of retaining features on the motor and/or pole spacers interfacing with corresponding features on a rotor core, the use of a monolithic magnet in the rotor, and/or use of a carbon fiber sleeve. The rotor can include an eddy current shield, disposed on the rotor core, on a surface of the rotor, or located within a sleeve surrounding the rotor. The rotor can be sized such that an air-gap between the rotor and a stator of a motor using the rotor is a predetermined amount that reduces electromagnetic losses such as eddy current losses.

8 Claims, 9 Drawing Sheets

(56) References Cited

U.S. PATENT DOCUMENTS

| | | | | |
|---|---|---|---|---|
| 4,741,094 | A * | 5/1988 | Denk | H02K 1/272 |
| | | | | 29/736 |
| 5,040,286 | A * | 8/1991 | Stark | H01F 41/0253 |
| | | | | 310/156.28 |
| 5,448,123 | A * | 9/1995 | Nilson | H02K 1/2733 |
| | | | | 310/216.127 |
| 6,657,348 | B2 * | 12/2003 | Qin | H02K 7/183 |
| | | | | 310/156.28 |
| 6,711,805 | B2 * | 3/2004 | Joho | H02K 1/223 |
| | | | | 29/598 |
| 7,474,029 | B2 | 1/2009 | Rahman et al. | |
| 8,247,938 | B2 | 8/2012 | Sabhan et al. | |
| 9,099,905 | B2 | 8/2015 | Manz et al. | |
| 9,369,012 | B2 | 6/2016 | Hattori et al. | |
| 9,800,108 | B2 * | 10/2017 | Ramdane | H02K 1/2726 |
| 10,439,460 | B2 * | 10/2019 | Nishifukumoto | H02K 1/28 |
| 10,498,181 | B2 | 12/2019 | Li et al. | |
| 10,714,998 | B2 * | 7/2020 | Kelly | H02K 7/04 |
| 10,826,357 | B2 * | 11/2020 | Peterson | H02K 11/012 |
| 2018/0316246 | A1 | 11/2018 | Andonian et al. | |
| 2019/0006916 | A1 | 1/2019 | Peterson et al. | |
| 2020/0227961 | A1 | 7/2020 | Brahmavar et al. | |

\* cited by examiner

ROTOR FOR ELECTRIC MOTORS

FIELD

This disclosure is directed to motors, particularly for use in compressors, having improved retention of components and/or improved electromagnetic properties.

BACKGROUND

Permanent magnet motors typically include a number of magnets distributed around a rotor core. The magnets can be separated from one another by spacers located between them, the spacers also distributed around the rotor core. However, at high rotational speeds, centrifugal force can cause separation of the magnets, spacers, and/or other rotor components. Such designs can also be limited in electromagnetic performance and/or expensive to construct.

SUMMARY

This disclosure is directed to motors, particularly for use in compressors, having improved retention of components and/or improved electromagnetic properties.

Pre-tensioned carbon fiber sleeves and/or sleeves where the carbon fiber is particularly oriented can provide sufficient retention strength to keep rotor components in place during motor operation. Interlocking features such as keyways provided on magnets and/or spacers on a rotor for a motor can improve the retention of the magnets and/or spacers, reducing requirements for additional retention and thus lowering costs, simplifying manufacturing, and/or presenting opportunities for alternative materials to be used in any further retention features.

Shafts incorporating monolithic magnets can also reduce potential issues regarding retention by using different means of retention and having to secure the magnet between rotor ends, instead of having to secure multiple magnets to surfaces of a rotor core. Additionally, monolithic magnets experience the forces resulting from rotation in a balanced manner.

Eddy current shielding can improve the electromagnetic performance of a particular rotor design. The eddy current shielding can be provided on a rotor core, on the magnets, on the spacers, and/or located within a retention sleeve provided over the rotor. Such a shield can provide shunting and/or reduction of electromagnetic losses within the rotor. The thickness of the eddy current shielding can be optimized based on a computed skin depth resulting from stator slot and switching harmonics.

The size of an air gap between the stator and the rotor of the electric motor can be selected to improve electromagnetic properties of the motor as a whole, based on other motor parameters such as switching frequencies, eddy current shield location and thickness, and other parameters affecting the overall electromagnetic efficiency of the stator and rotor taken together.

In an embodiment, a rotor for an electric motor includes a rotor core, a plurality of permanent magnets, and a plurality of spacers. The rotor core includes a plurality of channels each configured to receive a projection from one of the permanent magnets or one of the plurality of spacers.

In an embodiment, the rotor further includes a sleeve configured to surround the rotor core, the plurality of permanent magnets, and the plurality of spacers.

In an embodiment, the rotor further includes an eddy current shield. In an embodiment, the eddy current shield surrounds the rotor core, the plurality of permanent magnets are disposed on a surface of the eddy current shield and the plurality of spacers are disposed on the surface of the eddy current shield. In an embodiment, the eddy current shield surrounds the plurality of permanent magnets and the plurality of spacers. In an embodiment, the eddy current shield is disposed within the sleeve.

In an embodiment, a rotor for an electric motor includes a first rotor endpiece, a second rotor endpiece, and a permanent magnet, secured between the first rotor endpiece and the second rotor endpiece.

In an embodiment, the first rotor endpiece is secured to the permanent magnet by an adhesive and the second rotor endpiece is secured to the permanent magnet by the adhesive.

In an embodiment, the rotor further includes an aperture passing through a center of the permanent magnet from a first rotor endpiece end of the permanent magnet to a second rotor endpiece end of the permanent magnet and a shaft extending through the aperture. The first rotor endpiece and the second rotor endpiece are joined by the shaft.

In an embodiment, the rotor further includes a sleeve configured to surround a portion of the first rotor endpiece, a portion of the second rotor endpiece, and the permanent magnet.

In an embodiment, the rotor further includes one or more first retention features provided on the first rotor endpiece and one or more second retention features provided on the second rotor endpiece. Each of the first retention features and the second retention features are configured to engage with the sleeve.

In an embodiment, the sleeve includes a first flange configured to engage with the one or more first retention features and a second flange configured to engage with the one or more second retention features.

In an embodiment, the sleeve comprises a plurality of first openings each configured to receive at least one of the first retention features and a plurality of second openings each configured to receive at least one of the second retention features.

In an embodiment, the rotor further includes an eddy current shield located within the sleeve.

In an embodiment, the rotor further includes an eddy current shield surrounding the permanent magnet.

In an embodiment, a rotor and sleeve assembly for an electric motor includes a rotor. The rotor includes one or more magnets. The assembly also includes a sleeve configured to surround at least a portion of the rotor, with the sleeve including an eddy current shield disposed within a body of the sleeve.

In an embodiment, the body of the sleeve is a carbon fiber composite and the eddy current shield is copper.

DETAILED DESCRIPTION

This disclosure is directed to motors, particularly for use in compressors, having improved retention of components and/or improved electromagnetic properties.

Figure 1:
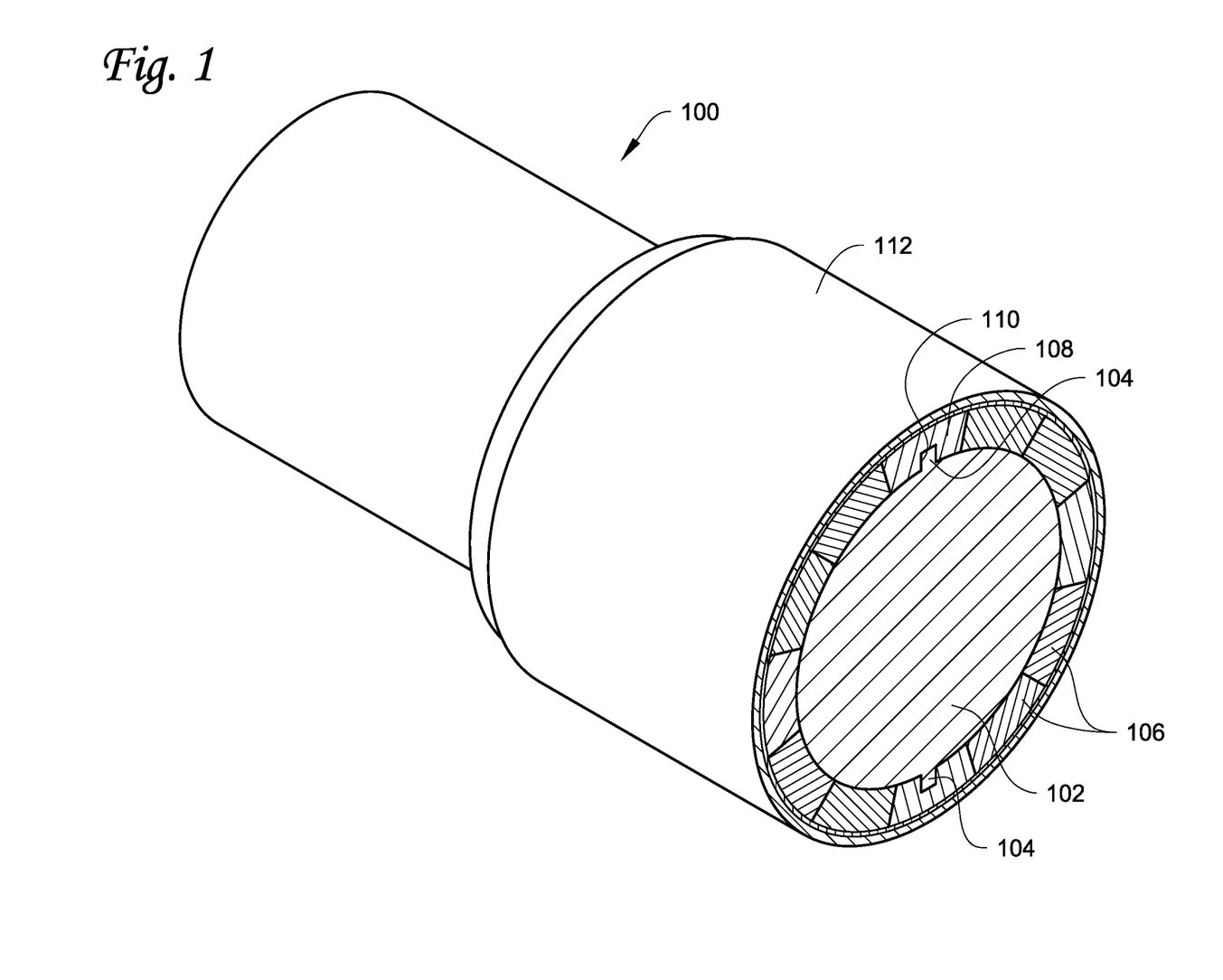
FIG. 1 shows a perspective review of a rotor and a sleeve according to an embodiment.

FIG. 1 shows a perspective review of a rotor and a sleeve according to an embodiment. Rotor 100 includes rotor core 102. Rotor core 102 includes projections 104. Permanent magnets 106 and pole spacers 108 are disposed radially around rotor core 102. In the embodiment shown in FIG. 1, pole spacers 108 include recesses 110 configured to receive projections 104. Rotor 100 further includes a retention sleeve 112 surrounding permanent magnets 106 and pole spacers 108.

Rotor 100 is a surface permanent magnet (SPM) rotor for use in an electric motor. Rotor 100 is configured to be rotated by electromagnetic torque provided by a stator (see FIG. 7) of the electric motor. Rotation of the rotor 100 resulting from the electromagnetic torque can be used to operate a device, for example a compressor such as a centrifugal compressor. Rotor 100 can be joined to or incorporated into a driveshaft to be rotated by operation of the electric motor. The driveshaft can be used, for example, to rotate an impeller such as an impeller of a centrifugal compressor. The rotor 100 can be used in, as a non-limiting example, hermetic or semi-hermetic centrifugal compressors used in chillers and/or heating, ventilation, air conditioning, and refrigeration (HVACR) systems having capacities of between 20 and 500 tons.

Rotor core 102 is a portion of rotor 100 towards a center of rotor 100. Rotor core 102 can include one or more projections 104. The projections 104 extend outwards from the surface of rotor core 102. The projections 104 can be, for example, a bar shape, one or more studs or pins, or any other suitable projection from the rotor core that can interface with the recesses 110. In embodiments, the projections 104 can extend a length of the pole spacers 108 along the axis of rotation of rotor 100. In an embodiment, some or all of projections 104 extend less than the length of the pole spacers 108. In an embodiment, each pole spacer 108 includes a recess 110. In an embodiment, only some of pole spacers 108 include the recess 110. While the recesses 110 are shown as being on pole spacers 108 in the embodiment shown in FIG. 1, it is understood that in embodiments, at least some of permanent magnets 106 can include the recesses 110 and interface with corresponding projections 104 from rotor core 102.

Permanent magnets 106 are a plurality of permanent magnets disposed on rotor core 102. Permanent magnets 106 can be any suitable permanent magnet material such as SmCo or NdFeB or the like. Permanent magnets 106 can be distributed radially around the rotor core 102. Pole spacers 108 can also be disposed on rotor core 102, arranged in spaces between permanent magnets 106. Pole spacers 108 combined with permanent magnets 106 define a plurality of magnetic poles that can respond to electromagnetic torque provided by the stator of the electric motor including rotor 100. Pole spacers 108 can be any suitable material, such as for example stainless steel and the like. Permanent magnets 106 and pole spacers 108 can abut one another. In an embodiment, the permanent magnets 106 and pole spacers 108 surround the rotor core 102. Permanent magnets 106 and pole spacers 108 can be included in any suitable number and configuration for providing magnetic poles allowing rotation of rotor 100.

Recesses 110 are formed in at least some of the pole spacers 108. Recesses 110 are configured to accommodate the projections 104. Recesses 110 can be any suitable shape corresponding to projections 104, such as a groove to accommodate bar-shaped projections 104, holes to accommodate studs or pins, or the like. The interface between the recesses 110 and projections 104 can assist in retaining the pole spacers 108 and/or permanent magnets 106, restricting slippage in a circumferential direction as rotor 100 turns. In embodiments, the interface between the recesses 110 and projections 104 can also restrict slippage of pole spacers 108 and/or permanent magnets 106 in an axial direction of the rotor 100.

Retention sleeve 112 is a sleeve surrounding the rotor core 102, permanent magnets 106, and pole spacers 108. The retention sleeve 112 can be any suitable material for retaining the permanent magnets 106 and pole spacers 108. In an embodiment, retention sleeve 112 can be a composite material such as a carbon fiber or glass fiber composite. In an embodiment, retention sleeve 112 is a metallic material. Retention sleeve 112 can be a pre-tensioned material. When the retention sleeve 112 is a composite material including a fiber such as carbon fiber or glass fiber, the fiber orientation can be selected such that the strength is matched to the directional forces that retention sleeve 112 is configured to resist. For example, there may be axial stresses such as thrust or component separation, as well as radial forces such as centrifugal force driving rotor components such as the permanent magnets 106 and pole spacers 108 away from rotor core 102. In embodiments, the fibers of a composite used for retention sleeve 112 can be such that at least a part of the fibers in the sleeve form a non-zero angle to the azimuth direction of the rotor 100. In an embodiment, the non-zero angle may be an angle in a range between 45 degrees and 90 degrees from the azimuth direction of the rotor 100. In an embodiment, the retention sleeve 112 can be assembled by wrapping the retention sleeve 112 directly to the rotor 100, while applying a tensile force on the fibers. In another embodiment, the retention sleeve 112 can be produced by pre-wrapping the retention sleeve 112 onto a mandrel and then shrink fitting and/or press fitting the retention sleeve 112 onto the rotor 100.

In an embodiment, retention sleeve 112 can be slid over the permanent magnets 106 and pole spacers 108. In an embodiment, retention sleeve 112 is not press-fit onto the magnets 106 and pole spacers 108. In an embodiment, retention sleeve 112 and the interface between recesses 110 and projections 104 are the sole sources of retention of the permanent magnets 106 and pole spacers 108 to the rotor core 102. In an embodiment, no adhesive is included to retain permanent magnets 106 and/or pole spacers 108 to rotor core 102.

Figure 2A:
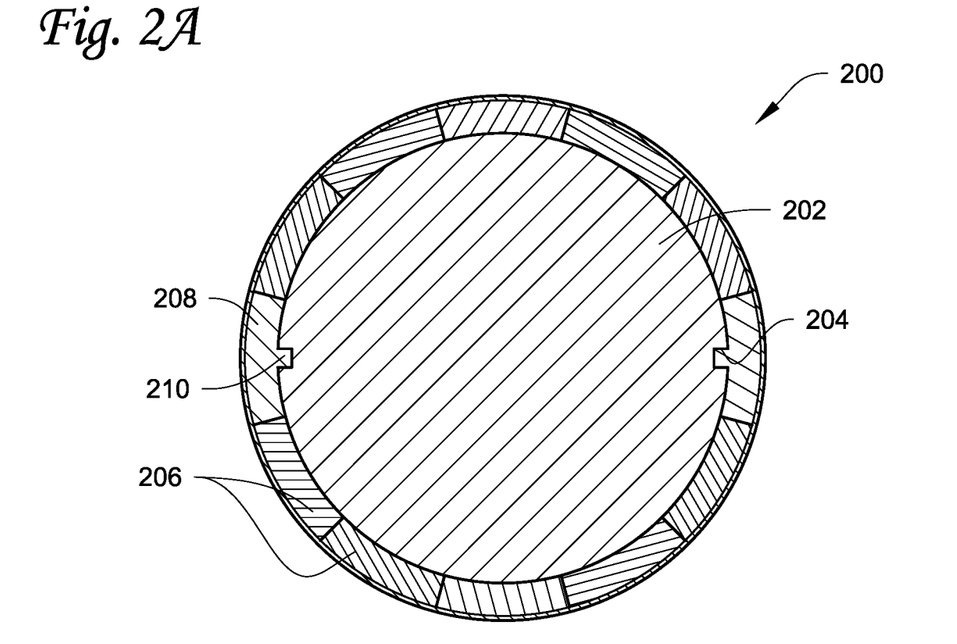
FIG. 2A shows a sectional view of a rotor according to an embodiment.

FIG. 2A shows a sectional view of a rotor according to an embodiment. In the embodiment shown in FIG. 2A, rotor 200 includes rotor core 202 including recesses 204, permanent magnets 206, and pole spacers 208 including projections 210.

In the embodiment shown in FIG. 2A, rotor core 202 includes recesses 204, and the projections 210 are provided on pole spacers 208.

Recesses 204 are formed in rotor core 202. Recesses 204 can be any suitable shape corresponding to projections 210, such as a groove to accommodate bar-shaped projections 210, holes to accommodate studs or pins, or the like. The interface between the recesses 204 and projections 210 can assist in retaining the pole spacers 208 and/or permanent magnets 206, restricting slippage in a circumferential direction as rotor 200 turns. In embodiments, the interface between the recesses 204 and projections 210 can also restrict slippage of pole spacers 208 and/or permanent magnets 206 in an axial direction of the rotor 200. In embodiments, a recess 204 is included for each projection 210 provided on the pole spacers 208 of a particular rotor 200. In embodiments, the recesses 204 can have straight sides so that the projections 210 on pole spacers 208 can be inserted directly into the recesses 204 as the pole spacers 208 are placed on the exterior of the rotor core 202.

Permanent magnets 206 and pole spacers 208 are provided around rotor core 202. At least some of pole spacers 208 include projections 210. Projections 210 can be, for example, bar-shaped projections, pins or studs, or any other suitable shape of projection that can interface with the recesses 204 of the rotor core 202 when the pole spacers are placed onto the rotor core 202. While the embodiment shown in FIG. 2A shows projections 210 provided on each of pole spacers 208, it is understood that projections 210 can be provided on only some of pole spacers 208 in other embodiments. It will also be appreciated that the projections may be on the rotor core and the recesses on the spacers.

Figure 2B:
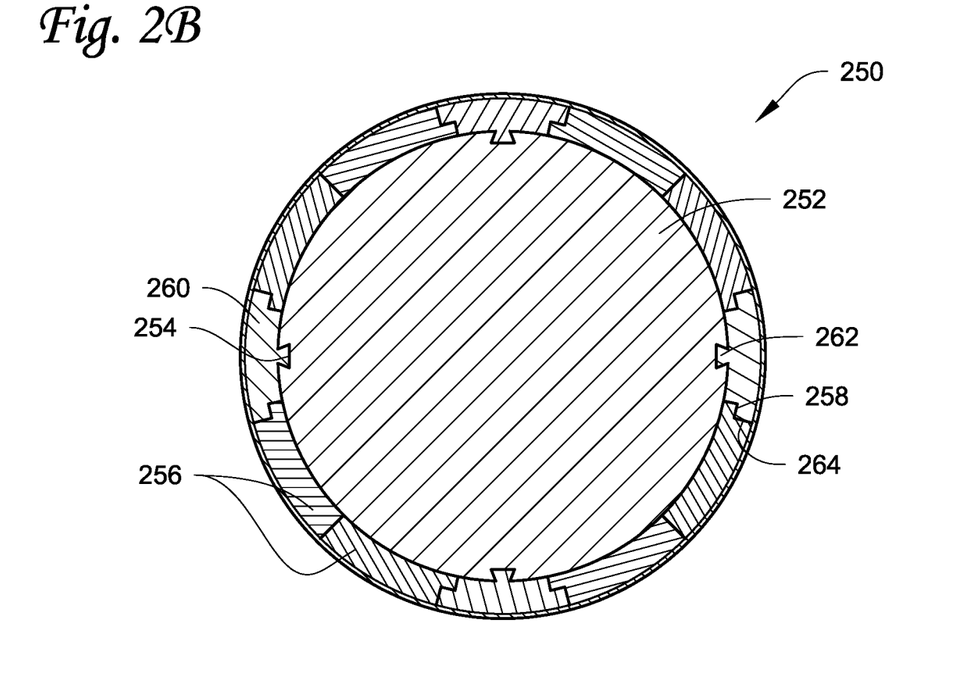
FIG. 2B shows a sectional view of a rotor according to an embodiment.

FIG. 2B shows a sectional view of a rotor according to an embodiment. In the embodiment shown in FIG. 2B, rotor 250 includes rotor core 252 including keyways 254, permanent magnets 256 each having shoulders 258, and pole spacers 260 including key projections 262 and engagement projections 264.

Rotor 250 is a surface permanent magnet rotor including rotor core 252, permanent magnets 256, and pole spacers 260 such that rotor 250 can be rotated by electromagnetic torque provided by a stator of an electric motor including rotor 250.

Rotor core 252 is a rotor core on which permanent magnets 256 and pole spacers 260 are disposed. Rotor core 252 includes keyways 254. Keyways 254 can be provided in rotor core 252. Keyways 254 can be channels configured to accommodate key projections 262. In an embodiment, keyways 254 have a portion within rotor core 252 that is wider than an opening of the keyway at the surface of the rotor core 252. In an embodiment, each of keyways 254 has a trapezoidal shape, with a shorter of the parallel sides of the trapezoid being at a surface of the rotor core 252. In an embodiment, the keyways 254 each extend at least a length of the key projections 262 provided on the pole spacers 260. In an embodiment, the keyways 254 each extend in a straight line parallel to the axis of the rotor 250. In an embodiment, the keyways 254 each allow the key projection 262 to be inserted straight into its respective keyway 254 during manufacture. In an embodiment, each keyway 254 in rotor core 252 has the same shape and/or dimensions.

Permanent magnets 256 are permanent magnets included to provide the magnetic poles allowing rotor 250 to be rotated by electromagnetic torque from the stator of a motor including rotor 250. In the embodiment shown in FIG. 2B, shoulders 258 are provided on each side of each of the permanent magnets 256. The shoulders 258 provide contact surfaces that can be contacted by the engagement projections 264 included in pole spacers 260, such that engagement between the engagement projections 264 and the shoulders 258 can retain permanent magnets 256 to resist outwards movement of the permanent magnets 256 away from rotor core 252 when rotor 250 is being rotated.

Pole spacers 260 are included between permanent magnets 256. The pole spacers 260 shown in FIG. 2B include key projections 262 and engagement projections 264.

Key projections 262 are projections from a side of pole spacer 260 facing the rotor core 252 when rotor 250 is assembled. Key projections 262 each have a cross-section selected such that it can fit into one of keyways 254, but that outwards movement away from rotor core 252 is limited by contact between the key projection 262 and keyway 254. In an embodiment, key projections 262 include at least a portion having a trapezoidal shape in cross-section, with a longer side of the trapezoidal shape at an end of the key projection 262 that is away from the body of the pole spacer 260. In an embodiment, a key projection 262 is provided on each of the pole spacers 260. In an embodiment, each key projection 262 extends over a length that is shorter or equal to a length of the main body of the pole spacer 260. In an embodiment, each key projection 262 maintains its cross-sectional shape over its entire length. Each key projection can be configured to be inserted straight into its corresponding keyway 254 when rotor 250 is assembled.

Engagement projections 264 extend from the sides of each pole spacer 260. In an embodiment, engagement projections 264 can continue the outer surface of the pole spacers 260. Engagement projections 264 are configured such that they can extend over the shoulders 258 of permanent magnets 256 adjacent the pole spacer 260, such that outwards movement of the permanent magnets would be obstructed by contact with the engagement projections 264.

While FIGS. 2A and 2B each show a rotor 200, 250 without a sleeve, sleeve assemblies such as the sleeve 114 shown in FIG. 1 and described above can be combined with embodiments including the features shown in FIGS. 2A and 2B. In embodiments, the mechanical retention provided by the features shown in FIGS. 2A and 2B, optionally along with a retention sleeve such as sleeve 114 shown in FIG. 1, can be the only sources of retention force for retaining the permanent magnets 206, 256 and pole spacers 208, 260 to rotor cores 202, 252. In an embodiment, either of rotor 200 or rotor 250, does not include adhesives retaining permanent magnets 206 or 256 and pole spacers 208 or 260 to the respective rotor core 202 or 252.

Figure 3:
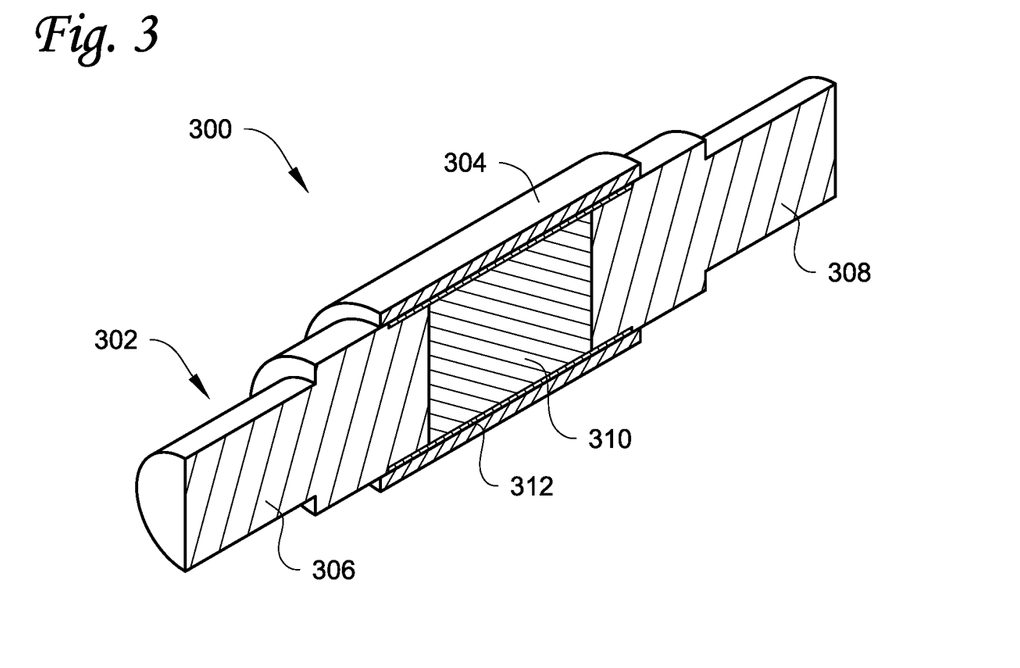
FIG. 3 shows a sectional view of a rotor and sleeve assembly according to an embodiment.

FIG. 3 shows a sectional view of a rotor and sleeve assembly according to an embodiment. Rotor and sleeve assembly 300 includes rotor 302 and sleeve 304. Rotor 302 includes first end piece 306, second end piece 308, and permanent magnet 310. In an embodiment, an eddy current shield 312 can be included between rotor 302 and sleeve 304.

Rotor 302 is a rotor of an electric motor. Rotor 302 is configured to rotate in response to application of electromagnetic torque, for example by a stator (see FIG. 7) of an electric motor including the rotor 302.

Sleeve 304 can be any suitable sleeve for use with the rotor 302. Sleeve 304 can include an eddy current shield, as described below and shown in FIG. 10. Sleeve 304 can be sized such that it can be slid onto the rotor 302. Sleeve 304 is configured such that it can retain rotor 302 and eddy current shield 312 within the range of rotational speeds for rotor 302 during operation of an electric motor. In some embodiments, sleeve 304 can be a composite material such as a carbon fiber composite or a glass fiber composite. Sleeve 304 can include the pre-tension and/or the fiber orientation as in retention sleeve 112 described above and shown in FIG. 1. In embodiments, the pre-tension and/or fiber orientation can be selected to provide axial force for retaining first end piece 306, permanent magnet 310, and second end piece 308 to one another. In embodiments, the fiber orientation in sleeve 304 can be such that at least a part of the fibers in the sleeve form a non-zero angle to the azimuth direction of the rotor 302. In an embodiment, the non-zero angle may be an angle in a range between 45 degrees and 90 degrees from the azimuth direction of the rotor 302. In an embodiment, the sleeve 304 can be assembled by wrapping the sleeve 304 directly to the rotor 302, while applying a tensile force on the fibers. In another embodiment, the sleeve 304 can be produced by pre-wrapping the sleeve onto a mandrel and then shrink fitting and/or press fitting the sleeve 304 onto the rotor 302.

First end piece 306 forms one end of the rotor 302. First end piece 306 is provided on a first side of the permanent magnet 310. Second end piece 308 forms an opposite end of the rotor from first end piece 308, on an opposite side of permanent magnet 310. At least one of first end piece 306 and/or second end piece 308 can be joined to or included in a driveshaft to be rotated by operation of the motor including rotor 302. The driveshaft can be used to operate, for example, an impeller. Each of first end piece 306 and second end piece 308 can be joined to permanent magnet 310 by any suitable means that allows rotation of permanent magnet 310 to be transferred to first end piece 306 and second end piece 308. Examples for joining first end piece 306, second end piece 308, and/or permanent magnet 310 to one another can include features on the sleeve 304, axial mechanical fasteners, radial mechanical fasteners, threading, shrink-fitting, press-fitting, adhesives, and/or interlocking retaining features, or the like. In an embodiment, axial thrust forces can contribute to the first end piece 306, second end piece 308, and/or permanent magnet 310 being retained to one another. Central axes of each of first end piece 306, second end piece 308, and permanent magnet 310 can be collinear when the rotor 302 is assembled. First and second end pieces can be made of any suitable materials, such as for example steel materials and the like. The first end piece 306 and/or the second end piece 308 can be made of a non-magnetic material, for example aluminum, titanium, austenitic stainless steel, carbon fiber composites, nickel-chromium alloys, or any other suitable non-magnetic material, or the like.

Permanent magnet 310 can be a single permanent magnet or composed of multiple magnets bonded to one another. Permanent magnet 310 can include any suitable permanent magnet materials such as SmCo or NdFeB or the like.

Eddy current shield 312 can optionally be provided on the rotor 302 or between rotor 302 and sleeve 304. Optionally, the eddy current shield can instead be located within sleeve 304, for example as described below and shown in FIG. 10.

Figure 4:
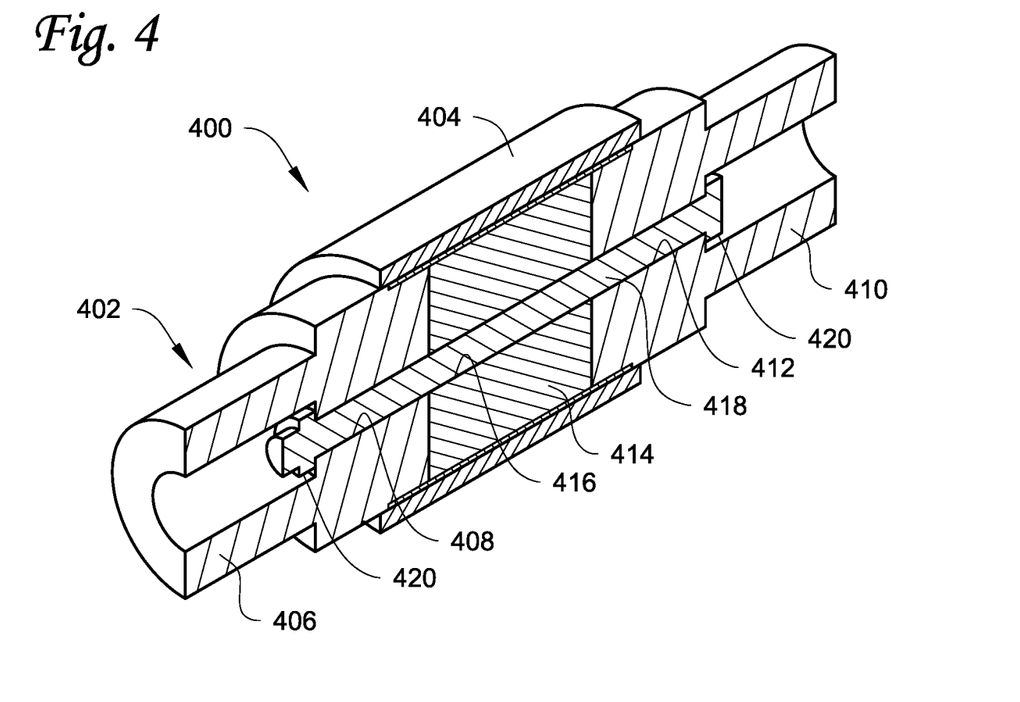
FIG. 4 shows a sectional view of a rotor and sleeve assembly according to an embodiment.

FIG. 4 shows a sectional view of a rotor and sleeve assembly according to an embodiment. Rotor and sleeve assembly 400 includes rotor 402 and sleeve 404. Rotor 402 includes first end piece 406 including first channel 408, second end piece 410 including second channel 412, and permanent magnet 414 having third channel 416. A shaft 418 extends through the first channel 408, second channel 412, and third channel 416. The shaft 418 is secured to first end piece 406 and second end piece 410, for example by flanges 420 provided towards opposite ends of the shaft 418.

Sleeve 404 can be any suitable sleeve for use with the rotor 402. Sleeve 404 can include an eddy current shield, as described below and shown in FIG. 10. Sleeve 404 can be sized such that it can be slid onto the rotor 402. In some embodiments, sleeve 404 can be a composite material such as for example a carbon fiber composite or a glass fiber composite or the like. Pre-tensioning, fiber orientation, and/or assembly of sleeve 404 can be according to the description of sleeve 304 provided above.

First end piece 406 forms one end of the rotor 402 and includes first channel 408. First channel 408 is a channel extending from a side of first end piece 406 configured to face the permanent magnet 414 through at least a portion of first end piece 406. The first channel 408 can have any suitable cross-sectional shape to allow shaft 418 to pass through the first channel 408. The first channel 408 can be concentric with the first end piece 406. The first channel 408 can extend along a central axis of the rotor 402.

Second end piece 410 forms a second end of rotor 402, opposite first end piece 406. At least one of first end piece 406 and second end piece 410 can connect to or be incorporated in a driveshaft to be rotated by the motor including rotor 400. Second end piece 410 includes second channel 412. Second channel 412 is a channel extending from a side of second end piece 410 configured to face the permanent magnet 414 through at least a portion of second end piece 410. The second channel 412 can have any suitable cross-sectional shape to allow shaft 418 to pass through the second channel 412. The second channel 412 can have the same shape and/or dimensions as first channel 408. The second channel 412 can be concentric with the second end piece 410. The second channel 412 can extend along a central axis of the rotor 402.

Permanent magnet 414 includes third channel 416. Third channel 416 is a channel extending all the way through permanent magnet 414 along an axis of the permanent magnet 414. Third channel 416 can be sized to allow shaft 418 to pass through permanent magnet 414. The third channel 416 can be concentric with the permanent magnet 414. Third channel 416 can have any suitable cross-sectional shape for accommodating shaft 418.

Shaft 418 is a shaft sized such that it can extend through first channel 408, second channel 412, and third channel 416 such that it extends from first end piece 406 though permanent magnet 414 to second end piece 410. In some embodiments, shaft 418 can be a stud or a bolt. Shaft 418 can be sized and have any suitable cross-sectional shape for passing through each of first channel 408, second channel 412, and third channel 416. In an embodiment, shaft 418 can be formed integrally with one of first end piece 406 or second end piece 410. In this embodiment, the end piece 406, 410 in which shaft 418 is formed integrally, the corresponding first or second channel 408, 412 is not formed in that end piece 406, 410.

Flanges 420 can be provided on shaft 418 such that the combination of first end piece 406, second end piece 410, and permanent magnet 414 can be retained together. Flanges 420 can extend from shaft 418 at or near opposite ends of shaft 418. The flanges 420 can be sized such that they cannot pass through any of first channel 408 or second channel 412. In an embodiment, at least one of flanges 420 can be integral with shaft 418. In an embodiment, at least one of flanges 420 can be removably incorporated into shaft 418, for example by being included in a nut or a washer secured by a nut that can be applied to a threaded end provided on shaft 418. Flanges 420 can retain first end piece 406, second end piece 410, and permanent magnet 414 together such that the first end piece 406 and second end piece 410 squeeze the permanent magnet 414.

Figure 5:
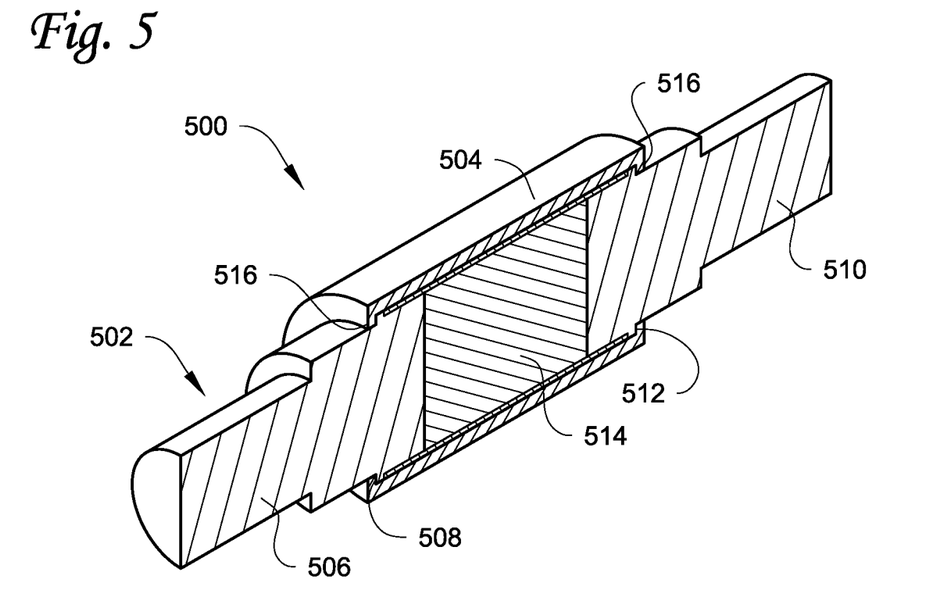
FIG. 5 shows a sectional view of a rotor and sleeve assembly according to an embodiment.

FIG. 5 shows a sectional view of a rotor and sleeve assembly according to an embodiment. Rotor and sleeve assembly 500 includes rotor 502 and sleeve 504. Rotor 502 includes first end piece 506 including a first shoulder 508, second end piece 510 including a second shoulder 512, and permanent magnet 514. The sleeve 504 includes flanges 516 at opposing ends of sleeve 504 such that each flange engages with one of first shoulder 508 and second shoulder 512 to secure first end piece 506, permanent magnet 514, and second end piece 510 together.

Rotor 502 includes first end piece 506 at a first end, second end piece 510 at an opposite end, and permanent magnet 514 located between the first end piece 506 and the second end piece 510. At least one of first end piece 506 and second end piece 510 can be connected to or included in a driveshaft to be driven by rotation of the rotor 502. Rotor 502 is retained together by engagement of the sleeve 504 with the first end piece 506 and second end piece 510.

Sleeve 504 can be used to retain first end piece 506, permanent magnet 514, and second end piece 510 together. In some embodiments, sleeve 504 can be a composite material such as for example, a carbon fiber composite or a glass fiber composite or the like. The sleeve can include flanges 516 at or near each respective end that are configured to engage with features formed in the first and second end pieces 506, 508 such as first shoulder 508 and second shoulder 512. Sleeve 504 can be sized and/or flanges 516 positioned with respect to the sizes of first end piece 506, second end piece 510, and permanent magnet 514, or the positions of shoulders 508, 512 such that the flanges 516 press first end piece 506 and second end piece 510 towards permanent magnet 514. Pre-tensioning, fiber orientation, and/or assembly of sleeve 504 can be according to the description of sleeve 304 provided above.

First shoulder 508 and second shoulder 512 are each recesses in an end of the outer perimeter of first end piece 506 and second end piece 510, respectively. Each of first shoulder 508 and second shoulder 512 are configured to provide contact surfaces configured to engage with flanges 516 provided on sleeve 504, such that the contact of the flanges 516 with first shoulder 508 and second shoulder 512 provides pressure that pushes the first end piece 506 and second end piece 510 towards permanent magnet 514. In an embodiment, grooves can be provided in place of first shoulder 508 and second shoulder 512 to receive the flanges 516 of sleeve 504 to retain the rotor 502 together. In an embodiment, the first shoulder 508 and/or second shoulder 512 can include roughened surfaces for contacting the flanges 516.

Figure 6A:
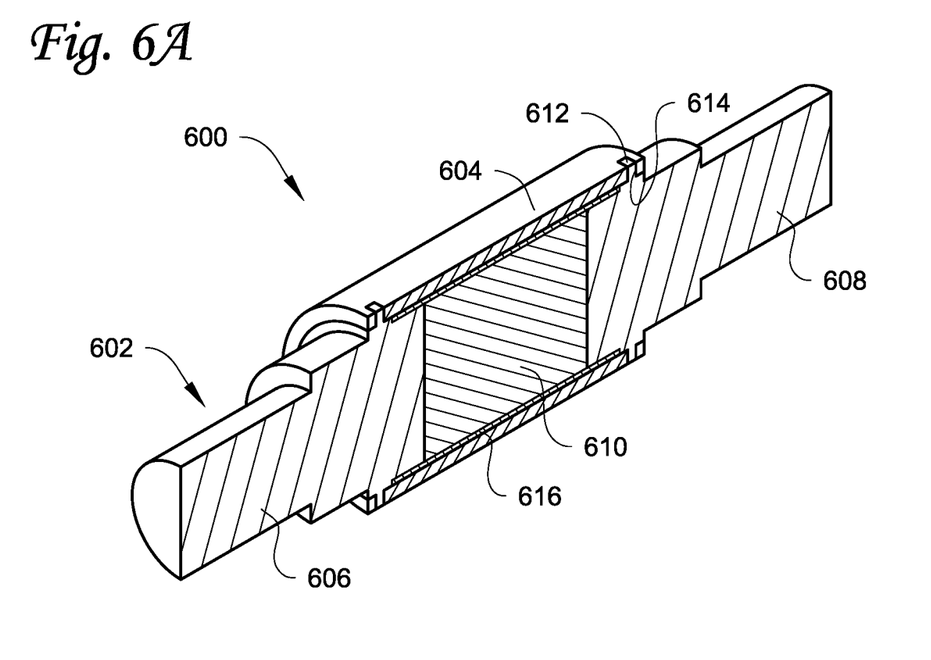
FIG. 6A shows a sectional view of a rotor and sleeve assembly according to an embodiment.

FIG. 6A shows a sectional view of a rotor and sleeve assembly according to an embodiment. Rotor and sleeve assembly 600 includes rotor 602 and sleeve 604. Rotor 602 includes first end piece 606, second end piece 608, and permanent magnet 610. Each of first end piece 606 and second end piece 608 include a plurality of projections 612 radially distributed around a circumference of that respective end piece 606 and 608. Sleeve 604 includes a plurality of slots 614 configured to receive the projections 612 and positioned correspondingly to the projections 612. An eddy current shield 616 can surround permanent magnet 610 and portions of first and second end pieces 606, 608.

Rotor 602 includes first end piece 606 at a first end, second end piece 608 at an opposite end, and permanent magnet 610 located between the first end piece 606 and the second end piece 608. At least one of first end piece 606 and second end piece 608 can be connected to or included in a driveshaft to be driven by rotation of the rotor 602. Rotor 602 is retained together by engagement of the sleeve 604 with projections 612 provided on each of first end piece 606 and second end piece 608. Projections 612 are radially distributed around the outer surfaces of each of first end piece 606 and second end piece 608.

Sleeve 604 includes a plurality of slots 614 provided near the opposite ends of sleeve 604. In some embodiments, sleeve 604 can be a composite material such as for example a carbon fiber composite or a glass fiber composite or the like. Each of the slots 614 is positioned and sized such that it receives one or more of the projections 612. In an embodiment, the slots 614 are configured to accommodate all of the projections 612 provided on the first and second end pieces 606, 608. In an embodiment, the projections 612 and slots 614 are each respectively sized and positioned such that a snap fit is formed to secure each of the first end piece 606 and the second end piece 608 to the sleeve 604. Projections 612 and slots 614 can have any suitable shapes for interfacing with one another, such as the rectangular shapes for each shown in FIGS. 6A-6C.

The size of sleeve 604 and the respective positions of projections 612 and slots can be such that when each of first and second end pieces 606, 608 are engaged with sleeve 604, each of the first and second end pieces 606, 608 are pressed together towards permanent magnet 610. The rotor 602 can be held together primarily or entirely by the fit of the projections 612 with the slots 614 on sleeve 604. In an embodiment, adhesive may or may not be included between permanent magnet 610 and either of first end piece 606 and/or second end piece 608. Pre-tensioning, fiber orientation, and/or assembly of sleeve 604 can be according to the description of sleeve 304 provided above.

Figure 6B:
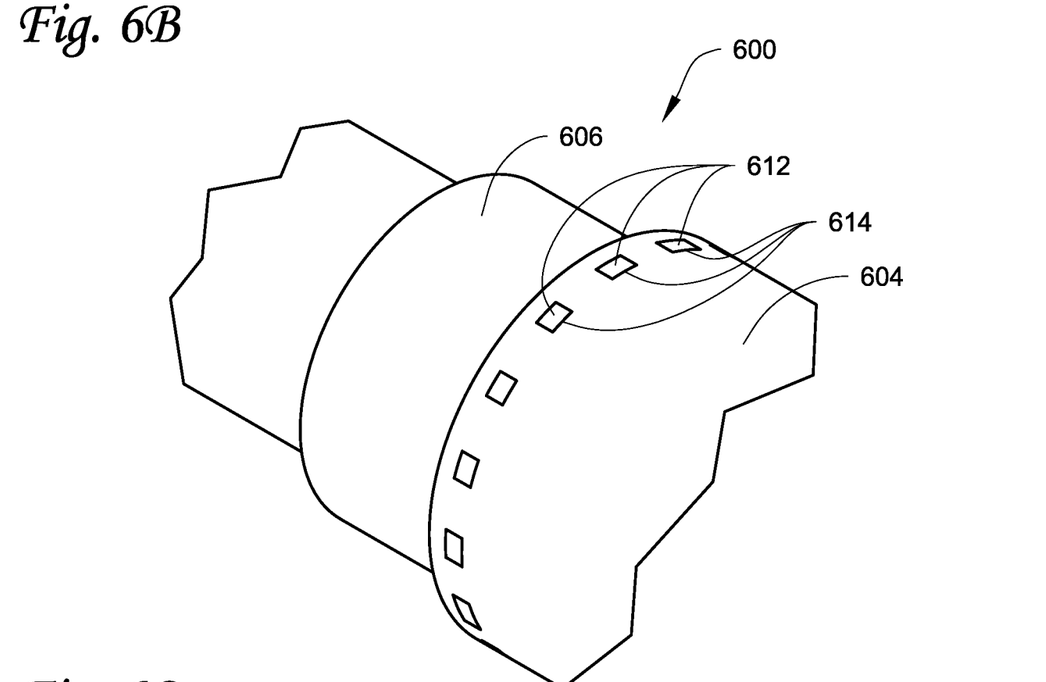
FIG. 6B shows a close-up view of the rotor and sleeve assembly of FIG. 6A.

FIG. 6B shows a close-up view of the rotor and sleeve assembly of FIG. 6A. FIG. 6B allows the plurality of projections 612 to be seen where they are received in the plurality of slots 614 that are formed in sleeve 604.

Figure 6C:
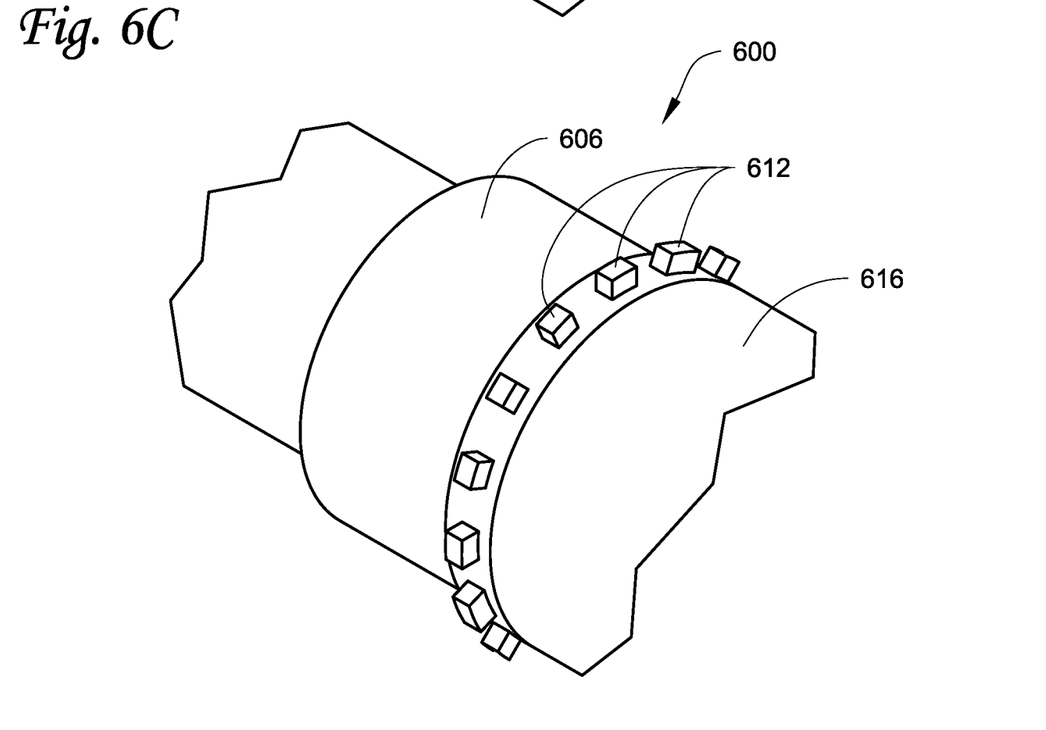
FIG. 6C shows a close-up perspective view of the rotor of FIG. 6A.

FIG. 6C shows a close-up perspective view of the rotor of FIG. 6A, with the sleeve 604 removed. In FIG. 6C, an eddy current shield 616 surrounding permanent magnet 610 is visible, as is first end piece 606. The plurality of projections 612 can be seen extending from the surface of the first end piece 606, radially distributed about the surface of the first end piece 606.

Figure 7:
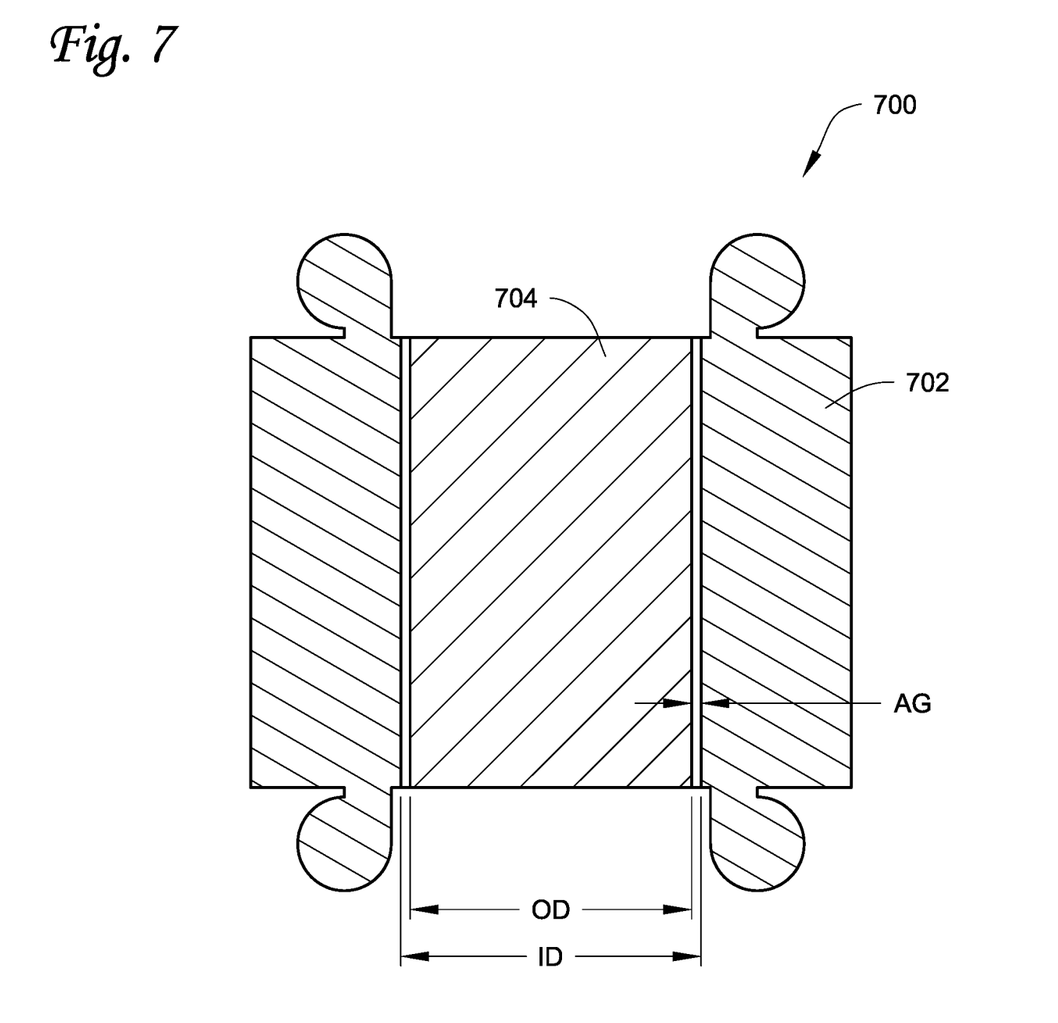
FIG. 7 shows a schematic of a motor according to an embodiment.
Figure 11:
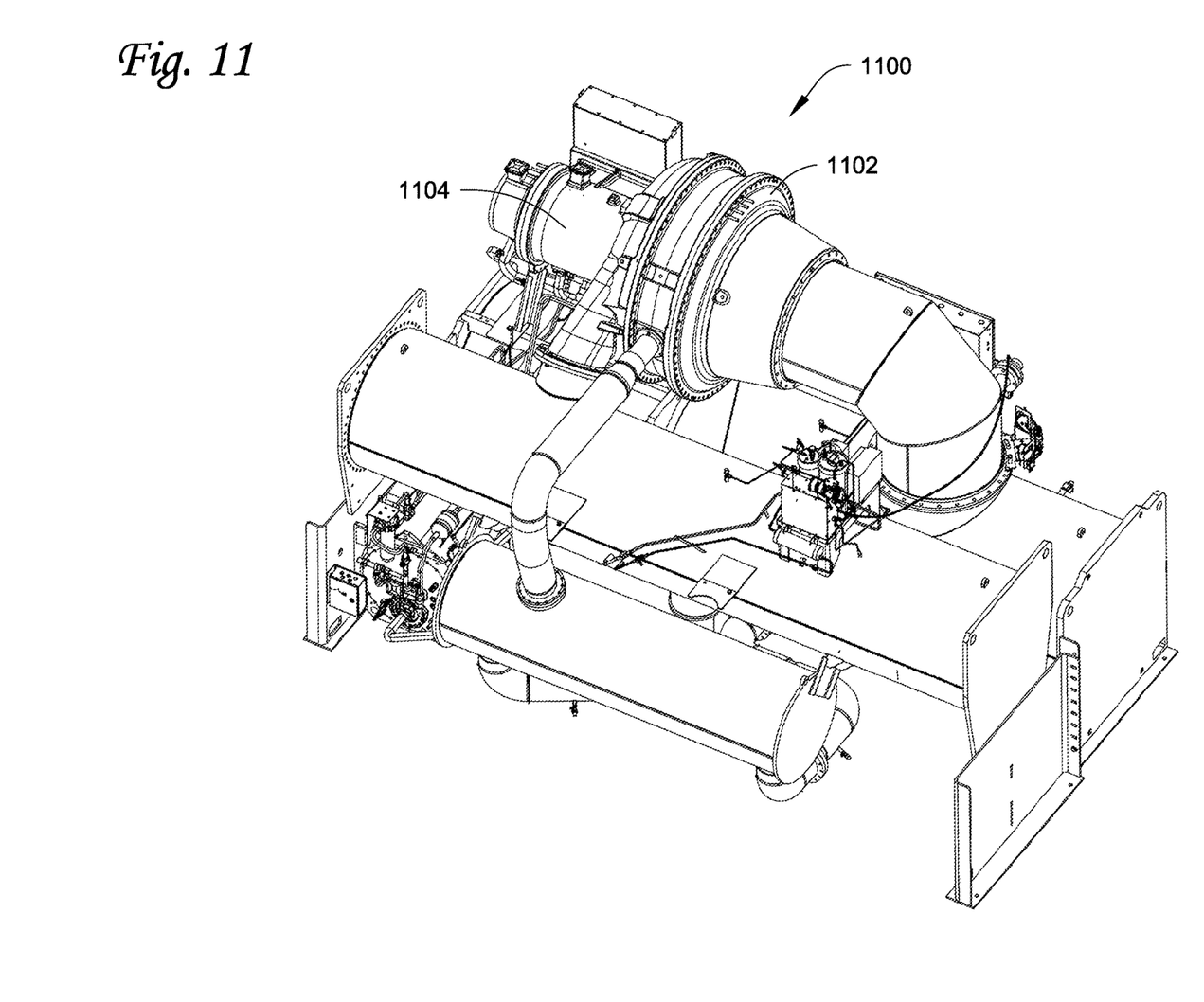
FIG. 11 shows a heating, ventilation, air conditioning, and refrigeration (HVACR) system according to an embodiment.

FIG. 7 shows a schematic of a motor according to an embodiment. Motor 700 includes a stator 702 and a rotor 704. Stator 702 has an interior diameter ID. Rotor 704 has an outer diameter OD. The difference between ID and OD is the air gap AG. Motor 700 can be a high-speed permanent magnet motor. In an embodiment, motor 700 can be included in a centrifugal HVAC system, as shown in FIG. 11 and described below. Motor 700 can be for a centrifugal HVAC system having a capacity in a range from at or about 20 tons to at or about 500 tons.

Stator 702 is a stator configured to generate electromagnetic torque capable of rotating rotor 704. Stator 702 can include a core and a winding. The core can include multiple slots having a slot pitch. Stator 702 can be energized using a variable-frequency drive (VFD). Switching by the VFD can lead to losses at the rotor by way of harmonics, particularly eddy current iron losses at the rotor 704.

Losses at rotor 704 can cause heating that can in turn lead to issues with the rotor such as exceeding a glass transition temperature for polymer components included therein, such as composite retention sleeves, heating-based elongation of the rotor, remanent flux in permanent magnets, or affecting demagnetization margins. Providing sufficient cooling to remedy or prevent these heating effects can lead to additional expense and inefficiency in designs of motors 700 and devices including such motors. While losses at rotor 704 can be controlled at the stator by way of filters, increased switching frequencies, or the like, this can lead to similar losses instead occurring at the stator 702, or requiring costly additional electronic controls.

Rotor 704 can include an eddy current shield such as, as non-limiting examples, the eddy current shields 812, 906, or 1008 described below and shown in FIGS. 8-10. Rotor 704 can be sized in relation to stator 702 such that air gap AG is sized based on the resulting rotor losses from the design including rotor 704. This can be determined based on a predicted skin depth of the stator slot harmonics along with the presence, thickness, and location of an eddy current shield included in rotor 704. In embodiments, the size of air gap AG can be a determined magnetic air gap between the stator 702 and the outermost of the eddy current shield or the permanent magnets and/or pole spacers of the rotor 704. The sizing of the rotor can be based on, for example, modeling of the motor 700 when operating at a full load, and/or modeling of the motor 700 when operating at a partial load. In an embodiment, the sizing of rotor 704 can be designed for improvement to integral part load value (IPLV) for a compressor including motor 700. IPLV can be reflective of the cost of operation of a compressor when it is at a partial load, providing a cost function for such operations. In an embodiment, the sizing of air gap AG can be based on the speed of the motor, for example being significantly larger for high-speed motors compared to lower-speed motors. Reduction of losses in rotor 704 by the eddy current shield and the sizing of the air gap AG can reduce cooling demands, improving efficiency and reducing design constraints on the motor 700 as a whole or systems including said motor.

The air gap AG can be based at least in part on the rotor surface speed for rotor 704. The rotor surface speed is a function of the diameter of rotor 704 and the design rotational speed for rotor 704 in motor 700. For example, in a high-speed motor embodiment where the surface speed of rotor 704 is between 100 and 200 m/s, the air gap AG can be, for example, between at or about 4.5 mm and at or about 7 mm. In this embodiment, the air gap AG can vary in length by at or about 0.1 mm to at or about 0.2 mm per 10 m/s of change to the surface speed of rotor 704. It is understood that these are nominal design measurements and can vary, for example, according to manufacturing tolerances or other similar deviations in dimensions of the rotor 700 and an optional sleeve on said rotor. In an embodiment, the sizing of the air gap AG can further be based on the type of rotor, such as an SPM rotor such as those shown in FIGS. 1 and 2 and described above, or a monolithic permanent magnet such as those shown in FIGS. 3-6C. In an embodiment, the size of air gap AG can be slightly larger for monolithic permanent magnet embodiment, for example having an air gap AG that is from at or about 5 mm to at or about 8 mm. The air gap AG determined based on the rotor surface speed can be a magnetic air gap based on the outermost magnetic component of rotor 704 including any sleeve provided on the rotor. The magnetic air gap may not include portions of the sleeve that are non-magnetic such as carbon fiber composite portions. In an embodiment, both the physical air gap and a thickness of a non-magnetic sleeve can be combined to find the magnetic air gap for motor 700.

Figure 8:
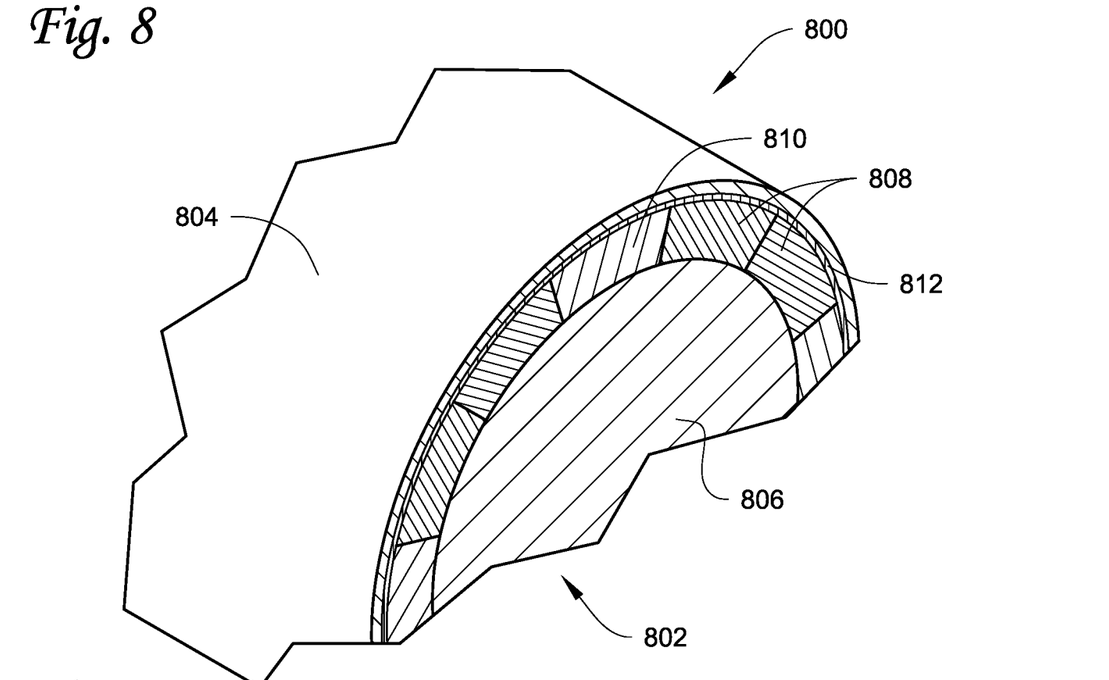
FIG. 8 shows a sectional view of a rotor and sleeve assembly including an eddy current shield according to an embodiment.

FIG. 8 shows a sectional view of a rotor and sleeve assembly including an eddy current shield according to an embodiment. Rotor and sleeve assembly 800 includes rotor 802 and sleeve 804. The rotor 802 includes rotor core 806, permanent magnets 808, and pole spacers 810. Eddy current shield 812 is provided on an outer surface of permanent magnets 808 and pole spacers 810.

Rotor 802 is a rotor of an electric motor. While rotor 802 is shown as a surface permanent magnet (SPM) rotor having multiple permanent magnets applied to a rotor core in FIG. 8, it is understood that rotor 802 can be any suitable type of rotor, also including the single permanent magnet such as the rotors 302, 402, 502, or 602 described above and shown in FIGS. 3-6C. Sleeve 804 is a sleeve used to retain components of the rotor 802. Sleeve 804 can be made of a non-conductive material such as, for example, composites such as carbon fiber or glass fiber composites or the like. Sleeve 804 can be, for example, any of the sleeves discussed above and shown in FIGS. 1-7 such as, for example, retention sleeve 112. Sleeve 804 can be pre-tensioned and have sufficient mechanical density, density, and thermal conductivity properties for use with rotor 802 under the operational conditions for the motor including rotor and sleeve assembly 800.

The SPM rotor design of rotor 802 as shown in FIG. 8 includes rotor core 806, permanent magnets 808, and pole spacers 810.

Rotor and sleeve assembly 800 further includes eddy current shield 812. Eddy current shield 812 is a conductive material configured to provide electromagnetic shunting. The electromagnetic shunting provided by eddy current shield 812 can reduce rotor losses that result from the circulation of high frequency currents caused by the power electronics switching harmonics in alternating current (AC) electric motors. Eddy current shield 812 can include a conductive material such as copper or any other suitable metal having similarly high conductivity. While the eddy current shield 812 is shown as incorporated into a surface permanent magnet type rotor in the embodiment of FIG. 8, it is understood that the eddy current shield 812 can be provided on an outer surface of any rotor, also including permanent magnet rotors such as those shown in FIG. 3, 4, 5, or 6A-6C and described above. In those embodiments, the eddy current shield 812 can be located between the outer surface of the rotor 802 and the inner surface of sleeve 804. In embodiments, eddy current shield 812 may not possess sufficient mechanical properties to retain components of rotor 802 by itself, for example eddy current shield 812 may be subject to deformation allowing displacement of permanent magnets 808 and pole spacers 810 when the rotor 802 is rotated at operational speeds. As such, while eddy current shield 812 surrounds the permanent magnets 808 and pole spacers 810, sleeve 804 can be used to provide the retention for those components. This can allow the use of more conductive materials to be used in eddy current shield 812 when compared to typical metallic materials that can be used for retention. Eddy current shield 812 may include discontinuities along its surface such that there are some openings or portions of rotor 802 not covered by eddy current shield 812, for example for stress relief or manufacturability.

Figure 9:
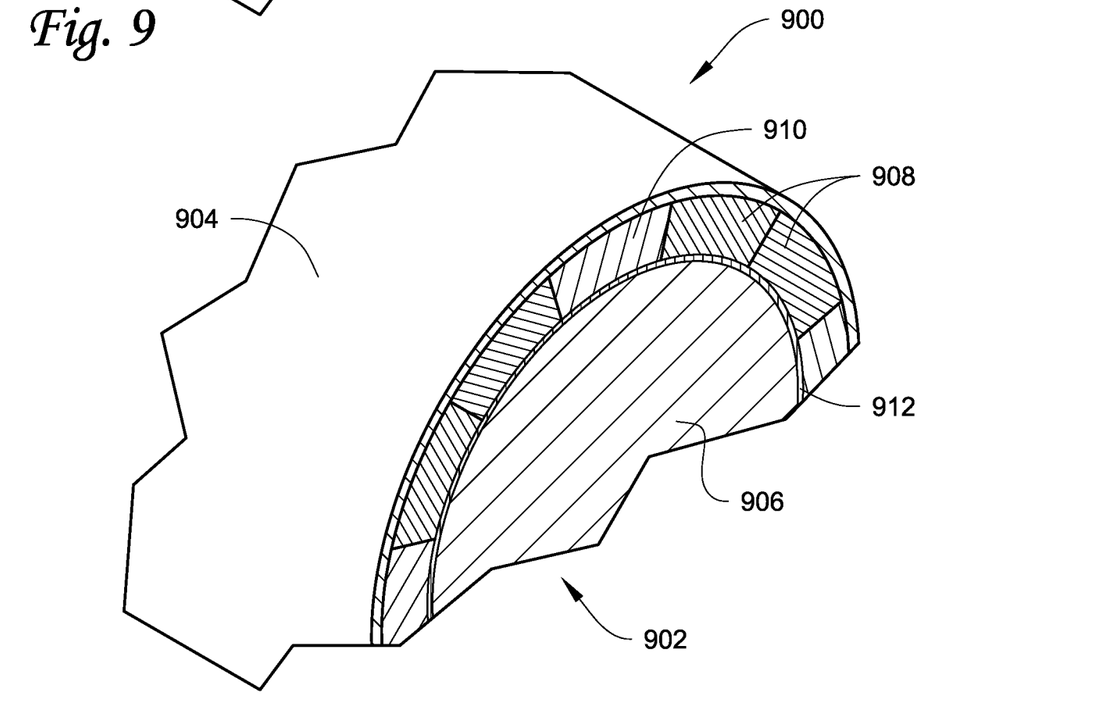
FIG. 9 shows a sectional view of a rotor and sleeve assembly including an eddy current shield according to an embodiment.

FIG. 9 shows a sectional view of a rotor and sleeve assembly including an eddy current shield according to an embodiment. Rotor and sleeve assembly 900 includes rotor 902 and sleeve 904. The rotor 902 includes rotor core 906, permanent magnets 908, and pole spacers 910. In the embodiment shown in FIG. 9, eddy current shield 912 is provided between rotor core 906 and the permanent magnets 906 and pole spacers 910, for example being located on an outer surface of rotor core 906.

Sleeve 904 can be any suitable retention sleeve for the rotor 902. Sleeve 904 can be made of a non-conductive material such as, for example, composites such as carbon fiber or glass fiber composites or the like. Sleeve 904 can be, for example, any of the sleeves discussed above and shown in FIGS. 1-7 such as, for example, retention sleeve 112.

Eddy current shield 912 is disposed between the rotor core 906 and permanent magnets 908 and pole spacers 910. Eddy current shield 912 can include a conductive material such as copper or any other suitable metal having similarly high conductivity. Eddy current shield can be secured to the rotor core 906 by any suitable method, such as mechanical fasteners, adhesives, or the like. Each of permanent magnets 908 and pole spacers 910 can be secured to the eddy current shield by suitable means such as mechanical fasteners, adhesives, or the like. Eddy current shield 912 may include discontinuities along its surface such that there are some openings or portions of rotor core 906 not covered by eddy current shield 912, for example for stress relief or manufacturability.

Figure 10:
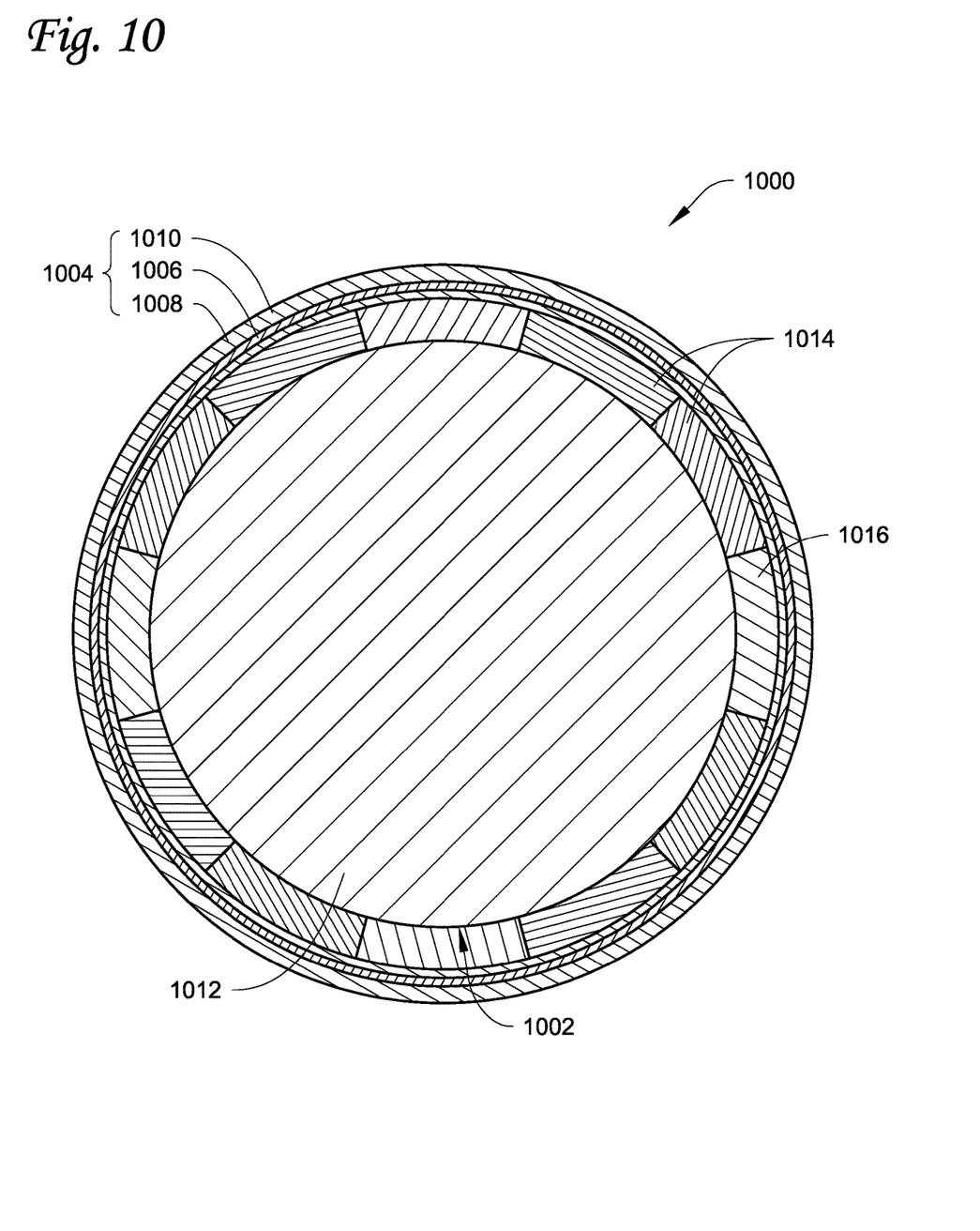
FIG. 10 shows a sectional view of a rotor and sleeve assembly including an eddy current shield according to an embodiment.

FIG. 10 shows a sectional view of a rotor and sleeve assembly including an eddy current shield according to an embodiment. Rotor and sleeve assembly 1000 includes rotor 1002 and sleeve 1004. Sleeve 1004 includes an eddy current shield 1006 located between an inner layer 1008 and an outer layer 1010. Rotor 1002 includes rotor core 1012, permanent magnets 1014, and pole spacers 1016.

Sleeve 1004 includes inner layer 1008, eddy current shield 1006, and outer layer 1010. Inner layer 1008 and outer layer 1010 can each be, for example, composite materials such as carbon fiber or glass fiber composites or the like. Each of inner layer 1008 and outer layer 1010 can be configured to have particular fiber directions and/or be pre-tensioned when applied. In embodiments, inner layer 1008 assembled by wrapping the inner layer 1008 directly to the rotor 1002, while applying a tensile force on the fibers, then placing the eddy current shield 1006 on an outer surface of inner layer 1008, then wrapping the outer layer 1010 onto the eddy current shield 1006 and optionally a portion of inner layer 1008. In another embodiment, the sleeve 1004 can be produced by pre-wrapping the inner layer 1008 onto a mandrel, placing the eddy current shield 1006 on an outer surface of inner layer 1008, then wrapping the outer layer 1010 onto the eddy current shield 1006 and optionally a portion of inner layer 1008 and then shrink fitting and/or press fitting the full sleeve 1004 onto the rotor 1002. The eddy current shield 1006 can be attached to the inner layer 1008 in pieces joined to the inner layer 1008 by adhesive, as one or more pieces wrapped around inner layer 1008, as a ring press-fit or shrink fit to the inner layer 1008, included as one or more fibers in a layer wrapped around inner layer 1008, or sprayed onto inner layer 1008.

Rotor 1002 is shown as being an SPM rotor including rotor core 1012, permanent magnets 1014, and pole spacers 1016. While the embodiment shown in FIG. 10 shows an SPM rotor, it is understood that the sleeve 1004 including the eddy current shield 1006 can be used in any sleeved rotor including permanent magnet rotors such as those shown in FIG. 3, 4, 5, or 6A-6C and described above. The sleeve 1004 can provide the retention force keeping the components of rotor 1002 in place. In an embodiment, sleeve 1004 is configured to retain permanent magnets 1014 and pole spacers 1016 in place while the rotor 1002 is being rotated during operation of a motor.

FIG. 11 shows a heating, ventilation, air conditioning, and refrigeration (HVACR) system according to an embodiment. HVACR system 1100 can be any suitable HVACR system for providing heating, ventilation, air conditioning, and/or refrigeration to one or more conditioned spaces. In an embodiment, HVACR system 1100 is a chiller, such as a centrifugal chiller. In an embodiment, HVACR system 1100 is a centrifugal chiller having a capacity of between at or about 20 tons to at or about 500 tons. In an embodiment, HVACR system 1100 includes a compressor 1102, which can be driven by a motor 1104. Compressor 1102 can be a centrifugal, scroll, screw, or any other such suitable compressor. In an embodiment, compressor 1102 is a centrifugal compressor. Motor 1104 can be, for example, an electrical motor such as the motor 700 shown in FIG. 7 and described above. Motor 1104 can include a rotor such as any of the rotors shown in FIGS. 1-10 and described above.

Aspects:

It is understood that any of aspects 1-6 can be combined with any of aspects 7-15 or 16-17. It is understood that any of aspects 7-15 can be combined with any of aspects 16 or 17.

Aspect 1. A rotor for an electric motor, comprising:
a rotor core;
a plurality of permanent magnets; and
a plurality of spacers,
wherein the rotor core includes a plurality of channels each configured to receive a projection from one of the permanent magnets or one of the plurality of spacers.

Aspect 2. The rotor according to aspect 1, further comprising a sleeve configured to surround the rotor core, the plurality of permanent magnets, and the plurality of spacers.

Aspect 3. The rotor according to aspect 2, further comprising an eddy current shield.

Aspect 4. The rotor according to aspect 3, wherein the eddy current shield surrounds the rotor core, the plurality of permanent magnets are disposed on a surface of the eddy current shield and the plurality of spacers are disposed on the surface of the eddy current shield.

Aspect 5. The rotor according to aspect 3, wherein the eddy current shield surrounds the plurality of permanent magnets and the plurality of spacers.

Aspect 6. The rotor according to aspect 3, wherein the eddy current shield is disposed within the sleeve.

Aspect 7. A rotor for an electric motor, comprising:
a first rotor endpiece;
a second rotor endpiece; and
a permanent magnet, secured between the first rotor endpiece and the second rotor endpiece.

Aspect 8. The rotor according to aspect 7, wherein the first rotor endpiece is secured to the permanent magnet by an adhesive and the second rotor endpiece is secured to the permanent magnet by the adhesive.

Aspect 9. The rotor according to aspect 7, further comprising:
an aperture passing through a center of the permanent magnet from a first rotor endpiece end of the permanent magnet to a second rotor endpiece end of the permanent magnet; and a shaft extending through the aperture,
wherein the first rotor endpiece and the second rotor endpiece are joined by the shaft.

Aspect 10. The rotor according to any of aspects 7-9, further comprising a sleeve configured to surround a portion of the first rotor endpiece, a portion of the second rotor endpiece, and the permanent magnet.

Aspect 11. The rotor according to aspect 10, further comprising:
one or more first retention features provided on the first rotor endpiece; and
one or more second retention features provided on the second rotor endpiece, wherein each of the first retention features and the second retention features are configured to engage with the sleeve.

Aspect 12. The rotor according to aspect 11, wherein the sleeve comprises a first flange configured to engage with the one or more first retention features and a second flange configured to engage with the one or more second retention features.

Aspect 13. The rotor according to aspect 11, wherein the sleeve comprises a plurality of first openings each configured to receive at least one of the first retention features and a plurality of second openings each configured to receive at least one of the second retention features.

Aspect 14. The rotor according to any of aspects 11-13, further comprising an eddy current shield located within the sleeve.

Aspect 15. The rotor according to any of aspects 7-13, further comprising an eddy current shield surrounding the permanent magnet.

Aspect 16. A rotor and sleeve assembly for an electric motor, comprising a rotor, the shaft including one or more magnets, and a sleeve configured to surround at least a portion of the rotor, the sleeve including an eddy current shield disposed within a body of the sleeve.

Aspect 17. The assembly according to aspect 16, wherein the body of the sleeve is a carbon fiber composite and the eddy current shield is copper.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A rotor for an electric motor, comprising:
a first rotor endpiece;
a second rotor endpiece;
a permanent magnet, secured between the first rotor endpiece and the second rotor endpiece; and
a sleeve configured to surround a portion of the first rotor endpiece, a portion of the second rotor endpiece, and the permanent magnet;
wherein:
the first rotor endpiece includes a plurality of first retention projections,
the second rotor endpiece includes a plurality of second retention projections, and
the sleeve includes a plurality of first openings each configured to receive at least one of the first retention projections and a plurality of second openings each configured to receive at least one of the second retention projections.

2. The rotor of claim 1, wherein the first rotor endpiece is secured to the permanent magnet by an adhesive and the second rotor endpiece is secured to the permanent magnet by the adhesive.

3. The rotor of claim 1, further comprising:
an aperture passing through a center of the permanent magnet from a first rotor endpiece end of the permanent magnet to a second rotor endpiece end of the permanent magnet; and
a shaft extending through the aperture,
wherein the first rotor endpiece and the second rotor endpiece are joined by the shaft.

4. The rotor of claim 1, wherein the sleeve comprises a first flange configured to engage with a shoulder provided on the first rotor endpiece and a second flange configured to engage with a shoulder provided on the second rotor endpiece.

5. The rotor of claim 1, further comprising an eddy current shield located within the sleeve.

6. The rotor of claim 1, further comprising an eddy current shield surrounding the permanent magnet.

7. A rotor and sleeve assembly for an electric motor, comprising a rotor, the rotor including one or more magnets, and a sleeve configured to surround at least a portion of the rotor, the sleeve including an eddy current shield disposed within a body of the sleeve,
wherein the rotor further includes a first rotor endpiece and a second rotor endpiece,
the first rotor endpiece includes a plurality of first retention projections,
the second rotor endpiece includes a plurality of second retention projections, and the sleeve includes a plurality of first openings each configured to receive at least one of the first retention projections and a plurality of second openings each configured to receive at least one of the second retention projections.

8. The assembly of claim 7, wherein the body of the sleeve is a carbon fiber composite and the eddy current shield is copper.

\* \* \* \* \*